United States Patent [19]
Wee

[11] Patent Number: 5,705,945
[45] Date of Patent: Jan. 6, 1998

[54] SYNTHESIZABLE ARCHITECTURE FOR ALL-DIGITAL MINIMAL JITTER FREQUENCY SYNTHESIZER

[75] Inventor: Reginald Siang-Tze Wee, Singapore, Singapore

[73] Assignee: Tritech Microelectronics International Pte Ltd., Singapore, Singapore

[21] Appl. No.: 684,807

[22] Filed: Jul. 22, 1996

[51] Int. Cl.$^6$ ............................................. H04L 27/20
[52] U.S. Cl. ........................ 327/105; 327/106; 327/107; 327/151; 327/160; 327/164; 364/718; 364/721
[58] Field of Search ............................. 327/105, 106, 327/107, 147, 150, 151, 156, 159, 160, 407, 164, 129; 364/718, 721

[56] References Cited

U.S. PATENT DOCUMENTS

| | | | |
|---|---|---|---|
| 4,947,382 | 8/1990 | Lesea | 368/118 |
| 5,430,764 | 7/1995 | Chren, Jr. | 375/308 |
| 5,467,294 | 11/1995 | Hu et al. | 364/721 |

OTHER PUBLICATIONS

"Phase Locked Loops: Theory, Design and Application" by Best, McGraw–Hill Inc. 1993, pp. 202, 214, 216.

Primary Examiner—Timothy P. Callahan
Assistant Examiner—Dinh T. Le
Attorney, Agent, or Firm—George O. Saile; Stephen B. Ackerman

[57] ABSTRACT

An architecture and system for the implementation of an all digital frequency synthesizing system is described. The frequency synthesizing system has a count series retention table that contains a series of count integers that are selected by a count signal that chooses which series of the integers are to be linked to a periodic input reference frequency counter. The periodic input reference frequency counter will count a number of periods of a periodic input reference frequency and when the counter has reached the number of counts that is equal to the number of the count integer, the periodic output frequency will be toggled from logic level to another logic level. A new periodic output frequency period can be chosen by selecting a new series of count integers in the count retention table. This architecture is structured such that it can be implemented in an automated logic design system.

18 Claims, 3 Drawing Sheets

FIG. 1 - Prior Art

SYNTHESIZABLE ARCHITECTURE FOR ALL-DIGITAL MINIMAL JITTER FREQUENCY SYNTHESIZER

BACKGROUND OF THE INVENTION

1. Field of the Invention

This invention relates to frequency synthesizers and in particular to an all digital frequency synthesizer and especially to techniques for design of all digital frequency synthesizers using standard automated logic design systems.

2. Description of Related Art

It is well known in the art that a multiple number of frequencies can be generated from a single source. These techniques may be either analog or digital and may have output signals that are either analog sine waves or purely digital pulse trains.

A typical application for a frequency synthesizer is a phase locked loop. In a phase locked loop the output of the frequency synthesizer is compared to a reference signal. An error signal that represents the difference in the phase and frequency of the output of the frequency synthesizer and the reference signal is used to vary the frequency of the frequency synthesizer. The error signal is passed through a loop filter to eliminate any response to unwanted transient signals. As the error signal approaches zero, the phase locked loop is said to be locked.

A digital phase locked loop originally contained a binary reference signal and a binary output signal with an analog frequency synthesizer, loop filter and comparator. As digital circuits have improved in performance, the components may now be implemented in digital circuitry or a software program on a microcomputer.

FIG. 1 shows a block diagram of an all digital phase locked loop as described in *Phase Locked Loops: Theory, Design, and Application* by Best, McGraw-Hill Inc. 1993. The phase detector compares the output $u_2'$ of the digital control oscillator DCO with the digital reference signal $u_1$. The output of the phase detector is connected to the DN/UP input of the counter which forms the loop filter. The K clock is an input to the K counter that is frequency that is a frequency that is a factor M times the desired output frequency $F_o$ of the digital controlled oscillator DCO. The K Modulus Control sets the number at which the K counter will have a carry signal.

The DN/UP input to the K counter causes the K counter to count up to the value of the K Modulus if the DN/UP input has a level to activate the up counting. The DN/UP input causes the K counter to count down to zero if the DN/UP input has a level to activate the down counting. If the K counter exceeds the value of the K Modulus, the carry output is activated. If the K counter is decremented to less than zero, the borrow output is activated.

If the signals $u_1$ and $u_2'$ are of identical frequency and phase, the output of the phase detector will be a square wave. This will cause the K counter to count up for the first level of the square wave and to count down for the second level of the square wave. As long as the DN/UP input signal is a balanced square wave, neither the carry or the borrow outputs will be triggered. If the signals $u_1$ and $u_2'$ become out of phase and of unequal frequency, the period of the signal at the DN/UP input will not have equal period at the first level versus the second level and there will eventually be either a carry or a borrow signal.

The digital control oscillator DCO has and increment/decrement counter (ID counter). The ID clock input of the ID counter is a frequency that is a fraction of two times a factor N times the frequency $F_o$ of the output signal $u_2'$. The output ID out will be a frequency that is one half of the input ID clock.

The carry output of the Loop Filter is connected to the increment input INC of the ID counter and the borrow output of the Loop Filter is connected to the decrement input DEC of the ID counter. If the carry signal is activated, a single pulse is added to the ID counter output signal ID out and conversely if the borrow signal is activated, a single pulse is subtracted from the ID counter output ID out.

The ID counter output ID out is connected to the input CP of the +N counter. The N control determines the factor of N that the input CP is divided by to form the frequency $F_o$ of the output $u_2'$.

The variance of the phase and frequency of the output $u_2'$ from the desired frequency is called jitter. As the phase detector compares the reference signal $u_1$ to the output signal $u_2'$, any difference in frequency will be a function of the weighted number of carry pulses from the K counter versus the number of borrow pulses. The size of the error maybe on the order of the pulse width of the two signals $u_1$ and $u_2'$. Also the time required to become totally locked to a new reference frequency $u_1$ will be a function of the frequency of the K clock and again maybe as long as the pulse width of the reference signal $u_1$ and the output signal $u_2'$.

U.S. Pat. No. 5,430,764 (Chren, Jr.) describes a frequency synthesizer using a residue number system to generate an address to find a value in a look-up table containing the digital values of a sine wave. These values are presented to a digital-to-analog converter to create an analog sine to wave output.

U.S. Pat. No. 5,467,294 (Hu, et al.) illustrates an apparatus for the programmable generation of sine waves. The digital values to describe the sine wave is maintained in a ROM lookup table.

SUMMARY OF THE INVENTION

An objective of this invention is the generation of a binary wave form of a frequency that is synchronized to a reference signal, wherein any change in the binary wave form is accomplished with little time. Another object of this invention is to have a binary wave form with minimal jitter. Still another object of this invention is the elimination of multiple reference clock frequencies. And further still another object of this invention is to have a structure for the generation of the binary wave form such that it can be implemented within a synthesizing automated logic design system.

To accomplish these and other objects, the present invention is a frequency synthesizing system that will generate a periodic output frequency. The periodic output frequency has a period that is composed of multiple periods of a periodic input reference frequency.

The frequency synthesizing system has a count compiler to generate a series of counting integers representing the number of periods of the periodic input reference frequency that compose the period of the periodic output frequency. The frequency synthesizing system also has a count series retention table to store a plurality of the series of counting integers; a count incrementing means to select the individual counting integers within the count series retention table; a frequency generation means that will count the number of periods in the period reference signal and when the count is equal to the integer of the from the count series retention table will force the periodic output frequency to change from one logic level to another. The count incrementing means will increment and the process will repeat continuously. If a different period for the periodic output frequency is required, then a count select signal will choose another series of counting integers and a different series of counting integers will be presented to the frequency generation means.

DETAILED DESCRIPTION OF THE INVENTION

Figure 1:
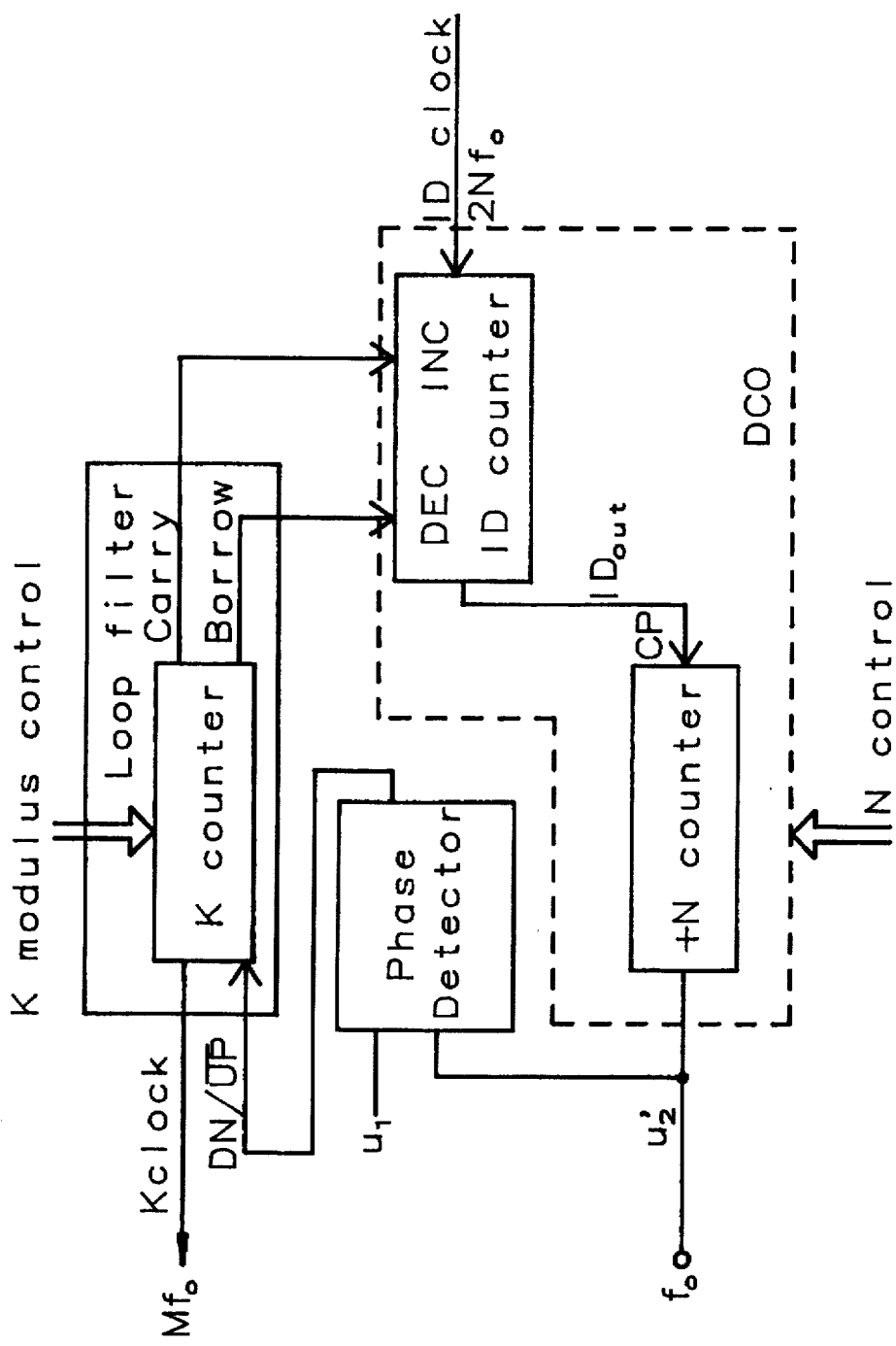
Figure 2:
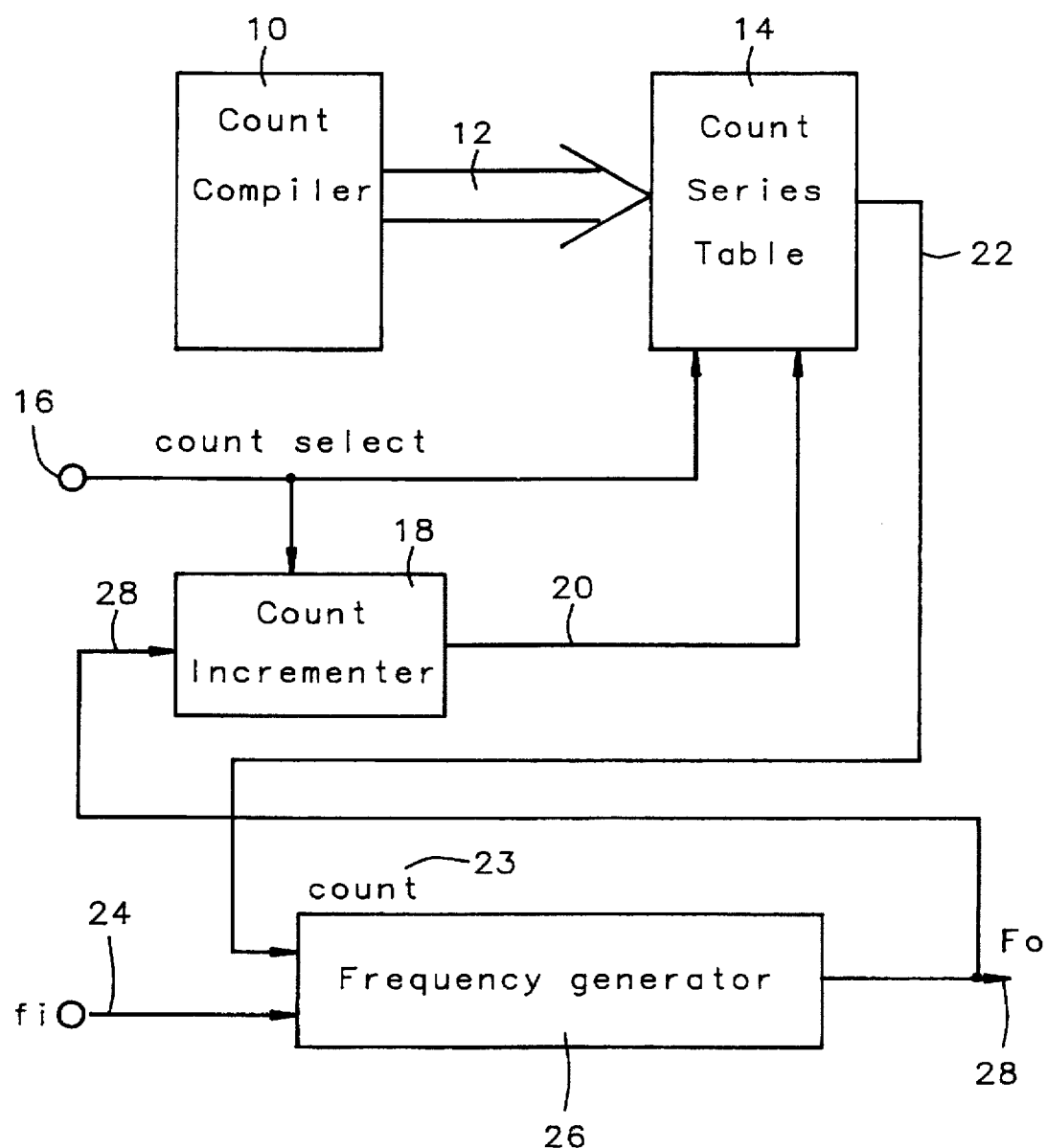

Referring to FIG. 2, a frequency generator 26 has an periodic input reference frequency ($f_i$) 24. The periodic output frequency $F_o$ is derived by creating each period of time that elapses between a transition of the output 28 from a logical 1 to a logical 0 or from a logical 0 to a logical 1. The period of time for the periodic output frequency $F_o$ is determined by counting a number of pulses of the periodic input reference frequency ($f_i$) 24 and toggling the output 28 from one logic level to another, then counting the pulses of the periodic input reference frequency ($f_i$) 24 again and then toggling the output 28 again from the one logic level back to the original logic level. This process is repeated to form the periodic output frequency $F_o$ at the output 28.

The number of pulses of the periodic input reference frequency ($f_i$) 24 to be counted is set by the count input 23 of the frequency generator 26. If the ratio ($X_n$) of the periodic output frequency $F_o$ to the periodic input reference frequency ($f_i$) 24 is an integer, the count input 23 is set to the value of that integer. For example if:

$F_o = 2.457$ Mhz $f_i = 12.288$ Mhz count=$f_i/F_o=X_n=5$.

Therefore, the count input 23 has the value of 5 and the frequency generator 26 will set the output 28 at the beginning of the sequence to a logic 1, then count 5 periods of the periodic input reference frequency ($f_i$) 24 then toggle the output 28 to a logic 0 and count 5 periods of the periodic input reference frequency ($f_i$) 24 and repeat this process continuously.

However, if the ratio $X_n$ of the periodic input reference frequency ($f_i$) 24 to the periodic output frequency $F_o$ is a mixed number of an integer and a fraction, it then must be decomposed into a series of numbers that is the weighted average of two integers, wherein the two integers are consecutive integers. The smaller of the two integers is the integer lesser than the mixed number and the larger number is the next larger integer. For example:

$F_o = 2.560$ Mhz $f_i = 12.288$ Mhz count=$f_i/F_o=X_n=4\frac{4}{5}$ $r_n$=smallest number=4

$s_n$=largest number=5

The numerator of the weighted average of the ratio $X_n$ of the periodic input reference frequency ($f_i$) 24 to the periodic output frequency $F_o$, will form a summation of a series $S_n$ of the two integers $r_n$ and $s_n$. That is $S_n=r_n+s_n+r_n+s_n+\ldots+r_n+s_n$ the number of terms in the series $S_n$ is the denominator $q_n$ of the fraction of the mixed number and the number of the terms $s_n$ in the series $S_n$ is the residue of the division of the ratio $X_n$ of the periodic input reference frequency ($f_i$) 24 to the periodic output frequency $F_o$ divided by the denominator $q_n$ of the fraction of the mixed number.

The above fraction is formed by simplifying of the mixed number by searching for the lowest common denominator of the fraction. From the example above:

$$X_n = \frac{12{,}288{,}000}{2{,}560{,}000} = 4 + \frac{2048}{2560} = 4 + \frac{2\times2\times2\times2\times2\times2\times2\times2\times2\times2\times2}{2\times2\times2\times2\times2\times2\times2\times2\times5} = 4 + \frac{4}{5}$$

From the above it can be seen that the $q_n=5$. Continuing the above example:

$X_n=4\frac{4}{5}$ $q_n=5$ $r_n=4$ $s_n=5$

The number of $s_n$ terms=4

Therefore:

$$\frac{5+5+5+5+4}{5}$$

$S_n=5,5,5,5,4$.

The series $S_n$ is stored in the count series retention table 14. The count series retention table may be implemented as a register based look-up table, a read-only memory, or other logic structure that can contain the series of counting integers. The output 22 of the count series retention table 14 is connected to the count input 23 of the frequency generator 26.

The count compiler 10 is a subfunction of an automated logic design system that will calculate the entries to be placed in the count series retention table 14. The count compiler 10 will have the value of the periodic input reference frequency ($f_i$) 24 and a listing of the desired periodic output frequencies $F_o$ from which to compile each series of the counting integers as described above. The series of counting integers are placed in the count series retention table 14 through interface 12. Interface 12 may be a software compiling of the count series retention table 14 or a programming of the count series retention table 14 at the assembly of hardware for the frequency synthesizer.

The count select line 16 determines which series of the counting integers in the count series retention table 14 is to be sequentially presented to the frequency generator 26.

The periodic output frequency $F_o$ of the frequency generator 26 will remain constant with the jitter of one periodic input reference frequency ($f_i$) 24 cycle, since the counting integers differ by a value of 1. This difference of 1 within the series of counting integers translates to the period of one cycle of the periodic input reference frequency ($f_i$) 24.

Figure 3:
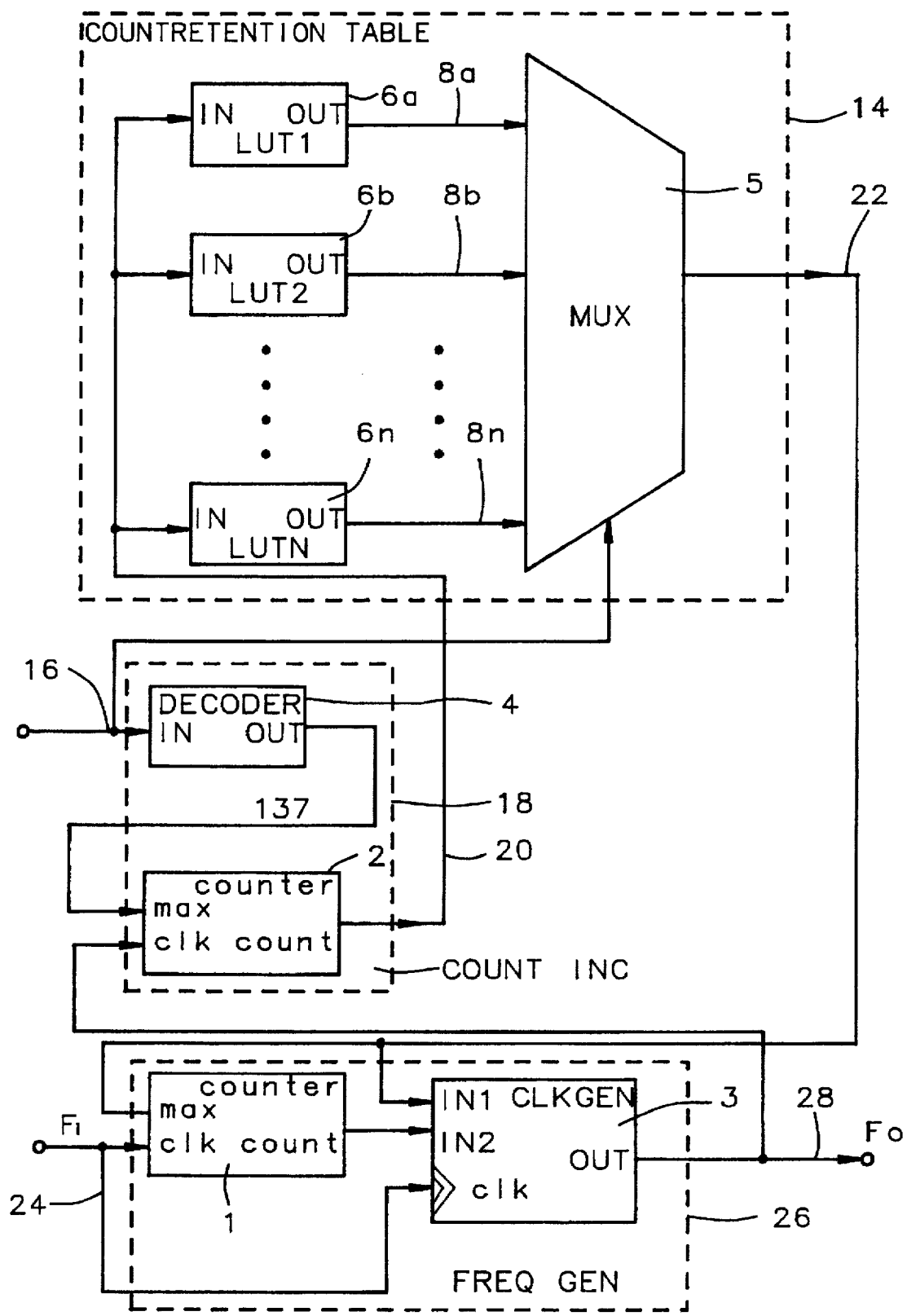

Referring to FIG. 3, the counts series table 14 has a plurality of look-up tables 6a, 6b, ..., 6n that contain the plurality of series of counting integers. The output 8a, 8b, ..., 8n of each look-up table 6a, 6b, ..., 6n is connected to a multiplexer 5. The count select line 16 is decoded in the multiplexer 5 to place one of the outputs 8a, 8b, ..., 8n at the output 22 of the multiplexer 5.

The output 20 of the count incrementer 18 is connected to the count look-up tables 6a, 6b, ..., 6n, to increment the look-up tables 6a, 6b, ..., 6n through the series of counting integers.

The count incrementer 18 has a decoder 4 and a counter 2. The decoder 4 determines the number of integers in the series of counting integers from the value of the count select input 16. The value of the number of integers in the series of counting integers is the input 13 to the counter 2. The count signal 20 that is the output of the counter 2 will increment at the end of the period of the periodic output frequency $F_o$. The increment well reset to the beginning of the series of the counting integers when the counter 2 reaches the value of the output 13 of the decoder 4.

The frequency generator 26 has a counter 1 that will count the number of periods of the periodic input reference frequency ($f_i$) 24. The periodic input reference frequency ($f_i$) 24 is connected to the clock input clk of the counter 1 and the output 22 of the count series retention table 14 is connected to the maximum count input MAX of the counter 1.

The counter 1 will place a logical 1 on the output count when the number of periods of the periodic input reference frequency ($f_i$) 24 equal to the number at the input MAX. The counter 1 will reset and start counting again. The will continue iteratively. The output count is connected to the input clk of the clock generator 3 and the output 22 of the count series retention table 14 is connected to the input IN1 of the clock generator 3. The output OUT of the clock generator 3 is the periodic output frequency 28. The periodic output frequency 28 will toggle from one logic state to another logic state at the reception of the signal from the output count of the counter 1, a transition of the periodic input reference frequency ($f_i$) 24. The output 22 contains the "divide by" value for the clock generator 3 for the present counting period. This value changes as the series $S_n$ is placed on the output 22 of the count retention table 14.

The counters 1 and 2 can be designed to switch at the positive edge, the negative edge, or beth the positive or the negative edges of the clock input clk. If both edges are used to trigger the counter 1, or 2, the periodic input reference frequency ($f_i$) 24 is effectively doubled. The only detriment of this doubling is that if the duty cycle, or the amount of time that the clock is at a logical 1 versus the amount of time it is a logical zero is not 50% or equal, the output jitter will be increased by the amount of the imbalance in this time.

The architecture of this invention is such that it can be easily synthesized using an automated logic design system or so called silicon compiler. The silicon compiler system allows the design of the frequency synthesizer system of this invention using a programming language like construct, or hardware description language, to describe the hardware function.

The silicon compiler will then compile this hardware description language into a technology specific hardware design. Table 1 is an example of a hardware description language for the counter 1 and 2 of FIG. 3 configured to respond to both the positive and negative edges of the transitions of the input reference frequency and is referred to as a dual edge counter. Table 2 is an example of the hardware description language for the clock generator 3. The hardware description language of these examples uses a construct that is similar t the constructs of the C programming language. This allows for definitions of the input and output buses, the relative timing of the switching signals for the input and outputs, and at which conditions of the inputs that the outputs will switch state. From these conditions the silicon compiler will select the circuits and configure the circuits for an implementation of the function.

TABLE 1

```
//============================
//Verilog HDL code for dual_edge_counter
//============================
module dual_edge_counter (max, clk, count):
input clk;
input [bussize:0]max;
output [bussize:0]count;
    always @ (posedge clk or negedge clk) begin
        if (count + 1 == max) begin // wrap around count
            count = 0;
        end
        else begin          /increment count
            count = count + 1;
        end
    end
endmodule // dual_edge_counter
```

TABLE 1

TABLE 2

```
//============================
//Verilog HDL code for clock_generator
//============================
module clock_generator (clk, IN1, IN2, OUT);
input clk;
input [bussize:0]IN1;
input [bussize:0]IN2;
output [bussize:0]OUT;
    always @ (posedge clk or negedge clk) begin
        if (IN1 == IN2) begin // toggle output pin
            if (OUT == 0) begin
                OUT = 1
            end
            else begin
                OUT = 0
            end
        end
    end
endmodule // dual_edge_counter
```

While this invention has been particularly shown and described with reference to the preferred embodiments thereof, it will be understood by those skilled in the art that various changes in form and details may be made without departing from the spirit and scope of the invention.

What is claimed is:

1. A frequency synthesizing system for the generation of a periodic output frequency of selected signal periods having a first level and a second level, wherein said selected signal periods constitute a number of at least two periods of a periodic input reference frequency, comprising:

a) a count compiler to generate a series of counting integers representing the number of periods of said periodic input reference frequency, wherein said counting integers are calculated by a method comprising the steps of:

dividing of one of the selected signal periods by the period of the periodic input reference frequency to form a quotient, decomposing of the quotient into a weighted average of a first integer and a second integer such that the firstinteger is a largest integer lesser than the quotient and the second integer is a value of the first integer plus one, simplifying said quotient to a mixed number having an integer and a fraction, wherein the fraction has a numerator and a denominator, and creating the series of counting integers that include the first and second integers, wherein the number of counting integers is the value of the denominator and the number of second integers in the series of integers is the value of a residue of a dividing of the numerator by the denominator and wherein the first and second integers are disbursed in a uniform manner within the series of counting integers;

b) a count series retention table coupled to the count compiler to retain a plurality of the series of counting integers, wherein each series of counting integers represent one of the selected signal periods, and wherein a count select signal chooses one of the series of counting integers and a count signal sequentially places each counting integer of the series of counting integers on a count output;

c) a count incrementing means to increment the count signal having a count select decoder coupled to the count select signal to determine the number of counting integers, and an output counter coupled to the periodic output frequency to increment the increment count signal to a next integer in the series of counting integers; and d) a frequency generation means to develop the periodic output signal, including:

a periodic input reference frequency counter coupled to the periodic input reference frequency and to the count output, wherein said periodic input reference frequency counter will create a max count signal when the number of periods of the periodic input reference frequency is equal to the counting integer, and a toggling means coupled to the periodic input reference frequency counter to alternate the periodic output signal from the first level to the second level and return to the first level at the reception of each counting signal.

2. The system of claim 1 wherein the periodic output frequency has a jitter wherein the jitter is less that the period of the periodic input reference frequency.

3. The system of claim 1 wherein the selected signal period is accomplished by changing the count signal and a small period of time relative to the selected signal period.

4. The system of claim 1 wherein said system is be implemented in an automated logic design system.

5. The system of claim 4 wherein the count compiler is a subcomponent of said automated logic design system.

6. The system of claim 1 wherein the count series retention table comprises:

a plurality of look-up tables wherein each look-up table is coupled to the count signal and wherein each look-up table contains the plurality of series of the counting integers such that each counting integer is placed at a look-up table output at each increment of the count signal, and b) a look-up table multiplexer coupled to each look-up table output of the plurality of look-up tables such that the counting integer selected by the count select signal is placed on the count output.

7. The system of claim 1 wherein the count series retention table is a read-only memory.

8. The system of claim 1 wherein the periodic input reference frequency contains no more than one transition from the first level to the second logic level and contains no more than one transition from the second logic level to the first logic level during the period of the periodic input reference frequency.

9. The system of claim 1 wherein the output signal counter counts at each alternating of the periodic output frequency and the periodic input reference frequency counter contains at each alternating of the periodic input reference frequency.

10. A frequency synthesizing circuit for the generation of periodic output frequency periods having a first level and a second level, wherein said selected signal periods constitute a number of at least two periods of a periodic input reference frequency, comprising:

a) a count series retention table to retain a series of counting integers representing the number of periods of said periodic input reference frequency, wherein said counting integers are generated in a count compiler and wherein said count compiler forms said counting integers by a method comprising the steps of:

dividing of one of the selected periods by the period of the periodic input reference frequency to form a quotient, decomposing of the quotient into a weighted average of a first integer and a second integer such that the first integer is a largest integer lesser than the quotient and the second integer is a value of the first integer plus one, simplifying said quotient to a mixed number having an integer and a fraction, wherein the fraction has a numerator and a denominator, and creating the series of counting integers that include the first and second integers, wherein a first quantity of counting integers is the value of the denominator and a second quantity of second integers in the series of integers is the value of a residue of a dividing of the numerator by the denominator and wherein the first and second integers are disbursed in a uniform manner within the series of counting integers, wherein a plurality of the series of counting integers are placed in said count series retention table by the count compiler, wherein each series of counting integers represent one of the selected signal periods, and wherein a count select signal chooses one of the series of counting integers and the count select signal sequentially places each counting integer of the series of counting integers on a count output;

b) a count incrementing means coupled to the count series retention table to increment a count signal having a count select decoder coupled to the count select signal to determine the number of counting integers to be transferred from said count series retention table, and an output counter coupled to the periodic output frequency to increment the count signal to a next integer in the series of counting integers; and c) a frequency generation means coupled to the count retention table and the count incrementing means to develop the periodic output frequency, including:

a periodic input reference frequency counter coupled to the periodic input reference frequency and to the count output, wherein said periodic input reference frequency counter will create a max count signal when the number of periods of the periodic input reference frequency is equal to the counting integer, and a toggling means coupled to the periodic input reference frequency counter to alternate the periodic output frequency from the first level to the second level and return to the first level at the reception of each counting signal.

11. The circuit of claim 10 wherein the periodic output frequency has jitter wherein the jitter is less that the period of the periodic input reference frequency.

12. The circuit of claim 10 wherein the selected period is accomplished by changing the count signal and a small period of time relative to the selected signal period.

13. The circuit of claim 10 wherein said system is implemented in an automated logic design system.

14. The circuit of claim 13 wherein the count compiler is a subcomponent of said automated logic design system.

15. The circuit of claim 10 wherein the count series retention table comprises
   a) a plurality of look-up tables wherein each look-up table is coupled to the count signal and wherein each look-up table contains the plurality of series of counting integers such that each counting integer is placed at a look-up table output at each increment of the count signal, and
   b) a look-up table multiplexer coupled to each look-up table output of the plurality of look-up tables such that the counting integer selected by the count select signal is placed on the count output.

16. The circuit of claim 10 wherein the count series retention table is a read-only memory.

17. The circuit of claim 10 wherein the periodic input reference frequency contains no more than one transition from the first level to the second logic level and contains no more than one transition from the second logic level to the first logic level during the period of the periodic input reference frequency.

18. The circuit of claim 10 wherein the output signal counter counts at each alternating of the periodic output frequency and the periodic input reference frequency counter counts at each alternating of the periodic input reference frequency.

* * * * *